May 27, 1930.   H. D. BROWN   1,760,580
SYSTEM OF DISTRIBUTION
Filed Feb. 21, 1925
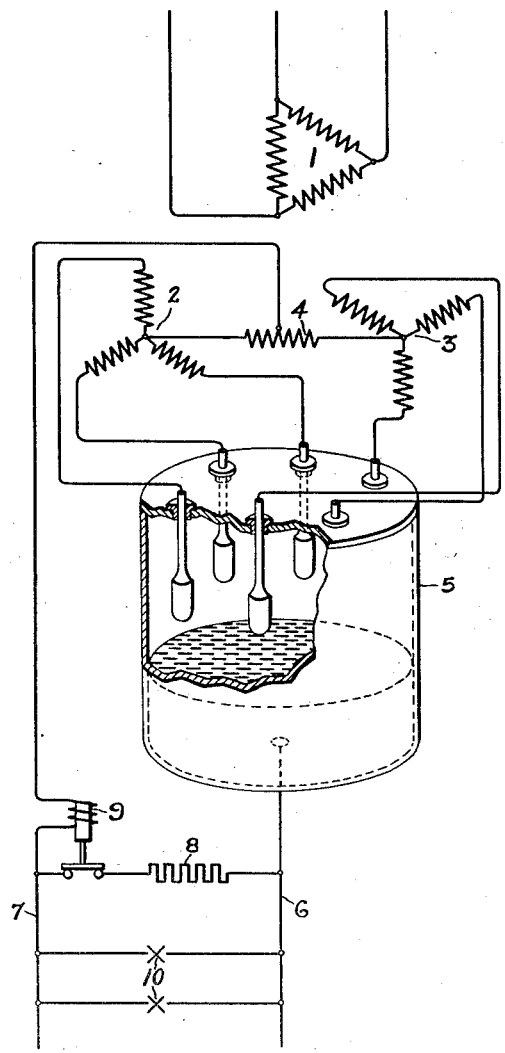
Inventor:
Herbert D. Brown;
by
His Attorney.

Patented May 27, 1930

1,760,580

UNITED STATES PATENT OFFICE

HERBERT D. BROWN, OF SCHENECTADY, NEW YORK, ASSIGNOR TO GENERAL ELECTRIC COMPANY, A CORPORATION OF NEW YORK

SYSTEM OF DISTRIBUTION

Application filed February 21, 1925. Serial No. 10,966.

My invention relates to systems of distribution, and more particularly to a system in which a consumption circuit is supplied with direct current by means of vacuum electric apparatus.

In rectification systems employing a plurality of secondary transformer windings with an interphase transformer connected between neutral points of each winding, there is a rapid rise in the direct current voltage as the load approaches zero. This increased voltage is due to the fact that the magnetizing current of the interphase winding is no longer present, and the proper voltage relationship no longer exists in the rectifier. For instance, in a three phase system such as illustrated, when the magnetizing current in the interphase winding is reduced to zero due to no load, the system becomes a six phase rectifier system, and the voltage in such a system will be about 10% to 15% higher than the average voltage of a three phase rectifier system.

While the range of loads, during which the voltage varies from the full load voltage to the higher no load voltage, is small, such a rise in voltage is often very undesirable and may be of sufficient value to destroy lamps or burn out motors supplied by the rectifier.

It is the object of my invention to provide means for preventing a rapid rise in voltage as the direct current load connected to a vapor rectifier device approaches zero. I have found that a small auxiliary load connected to the rectifier or converter drops the voltage from no load value to practically full load value at which the voltage remains constant over a wide range of loads. In the present instance I have employed an auxiliary load having a value varying from one half of 1% to 1% of the full load value, and a relay means to connect this auxiliary load to the rectifier and in shunt to the main load as the latter approaches zero.

The novel features which I believe to be characteristic of my invention are set forth with particularity in the appended claims. My invention itself, however, both as to its organization and method of operation will best be understood with reference to the following description taken in connection with the accompanying drawing in which the figure represents diagrammatically a circuit organization whereby my invention may be carried into effect.

I have designated as 1, a primary transformer winding which is connected to a source of alternating currents and which is inductively associated with a plurality of secondary windings 2 and 3. The latter windings are connected to their neutral points by means of an interphase transformer winding 4. An asymmetric conducting device 5, which in the present instance is a mercury vapor rectifier, is connected to the terminals of the secondary transformer windings, and to one of the mains 6 of the direct current consumption circuit. The other direct current main 7 is connected to the mid point of the interphase winding 4. The main load on the direct current circuit is indicated at 10 and may consist of any type of direct current consumption devices.

A resistance element or auxiliary load 8 is associated with the load circuit and is adapted to be connected to the rectifier and in shunt with the load circuit when the load current has decreased to a predetermined value. In order to effect control of the resistance a current responsive relay 9 is inserted in the load circuit. This relay serves to cut the auxiliary load into and out of circuit with the rectifier 5.

In ordinary operation relay 9 will be energized and the resistance element 8 will be disconnected from the rectifier. However, when the load gets below a certain point, as say 1% of the full load value, the relay will be actuated to insert the auxiliary load in circuit with the rectifier and in shunt with the main load. Insertion of the auxiliary load serves to maintain the voltage on the direct current circuit substantially constant even should the main load be reduced to zero.

What I claim as new and desire to secure by Letters Patent of the United States is:

1. A system of distribution comprising a source of alternating current and a direct current consumption circuit including a variable load, an asymmetric conducting device connected therebetween, means for preventing an increase in the voltage impressed on said circuit when the load approaches zero, said means comprising a resistance, and means responsive to an electrical condition in the said circuit for controlling said resistance.

2. A system of distribution comprising a source of alternating current and a direct current circuit including a variable load, an asymmetric conducting device connected therebetween, means for maintaining the voltage impressed on said circuit substantially constant as the load approaches zero, said means comprising a resistance and a relay controlling said resistance, said relay being responsive to an electrical condition in said direct current circuit.

3. In a system of distribution a source of alternating current, a direct current circuit including a variable load, a rectifier connected therebetween, an auxiliary load associated with said rectifier and means responsive to change in the load of said rectifier for connecting said auxiliary load to said rectifier and maintaining the voltage of said circuit substantially constant as its load approaches zero.

4. In a system of distribution a source of alternating current comprising a plurality of secondary windings, an interphase winding connecting said secondary windings, a direct current circuit, a main load supplied by said circuit, an asymmetric conducting device conected between said secondary windings and said circuit, an auxiliary load associated with the device, and means responsive to an electrical condition in said circuit for connecting said auxiliary load to said device as the main load approaches zero.

5. In a system of distribution a source of alternating current comprising a plurality of secondary transformer windings, an interphase winding connecting said secondary windings, an asymmetric conducting device connected to said secondary windings, a direct current consumption circuit connected to said interphase winding and conducting device and means in said circuit comprising a current relay and a resistance element for preventing an increase in the voltage supplied to said consumption circuit when the load on said circuit approaches zero.

6. In a system of distribution a source of alternating current comprising a plurality of secondary transformer windings, an interphase transformer winding connecting said secondary windings, an asymmetric conducting device connected to said secondary windings, a direct current consumption circuit including a main load connected to said interphase winding and conducting device, an auxiliary load, and means responsive to an electrical condition in said circuit for connecting said auxiliary load to said electric device and in shunt with said consumption circuit when the main load approaches zero.

In witness whereof, I have hereunto set my hand this 20th day of February, 1925.

HERBERT D. BROWN.